Feb. 13, 1940.         R. E. JOYCE, JR         2,190,518
                      AUTOMOBILE DOOR LATCH
                       Filed March 25, 1938

INVENTOR
Richard E. Joyce Jr.
By Dike, Calver & Gray
Attys.

Patented Feb. 13, 1940

2,190,518

UNITED STATES PATENT OFFICE 2,190,518

AUTOMOBILE DOOR LATCH

Richard E. Joyce, Jr., Meriden, Conn.

Application May 25, 1938, Serial No. 209,937

3 Claims. (Cl. 292—340)

This invention relates to door latches and more particularly, though not exclusively, to a latch for automobile doors.

Present day automobile doors require the exertion of a considerable force in order to be completely closed, with the result that it has become the common practice to slam the doors closed rather than forcing the same closed. While this is partly due to the provision of cushioning pads between the door posts and the doors which have to be compressed before the doors can latch, it is particularly the construction of the presently used door latches which makes the exertion of a considerable closing force imperative. The slamming of automobile doors is, however, highly objectionable not only because it is accompanied by disturbing noises and severe shocks to the door windows and their frames, resulting in early rattling of these windows, but also because such practice is highly dangerous as evidenced by frequent injuries to unaware passengers whose hands or feet got caught between doors and door posts.

It is, therefore, the primary aim and object of the present invention to provide a door latch, particularly for automobile doors, which requires such little force for closing the door that slamming is entirely unnecessary.

Before explaining in detail the present invention it is to be understood that the invention is not limited in its application to the details of construction and arrangement of parts illustrated in the accompanying drawing, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

Figure 1:
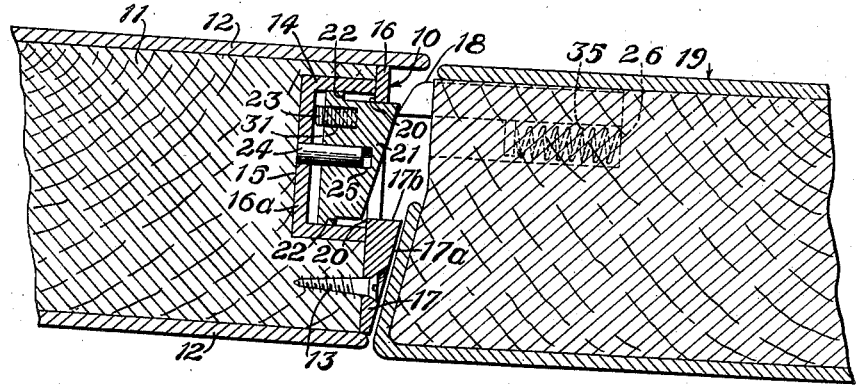
Fig. 1 is a fragmentary cross section through an automobile door and its post, showing a latch installed which embodies the present invention.

Referring to the drawing, the reference numeral 10 designates the striker plate of a latch which is secured to a post 11 in the steel frame 12 of an automobile body by any suitable means, such as screws 13. The striker plate 10 is provided with a rectangular casing 14 which is open at one side and received in a cavity 15 of the post 11. The casing 14 is preferably made separately and permanently secured to the striker plate 10 by spot welding, brazing or the like. The striker plate 10 is machined to provide a latch 17, having a wedging surface 17a and a shoulder 17b with which a latch bolt 18 is adapted to cooperate in order to prevent the automobile door 19 from flying open when the same is not completely closed.

Figure 2:
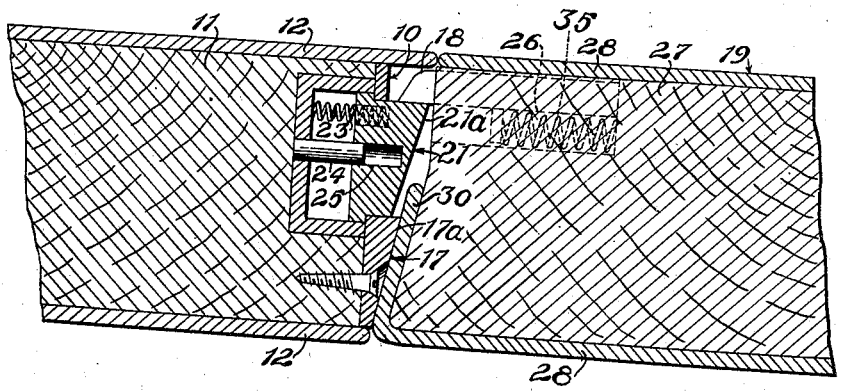
Fig. 2 is a fragmentary section similar to Fig. 1, showing the automobile door closed, however.
Figure 3:
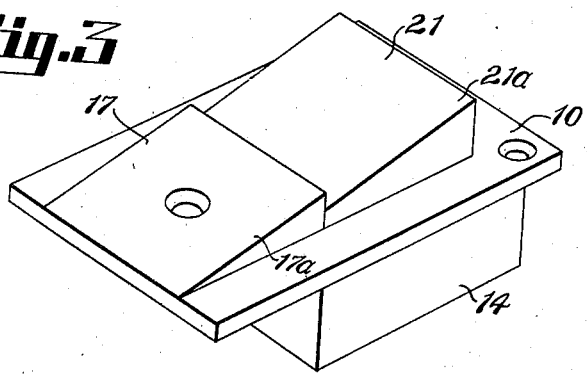
Fig. 3 is an enlarged perspective view of the striker plate of the present latch.

The striker plate 10 also provides shoulders 20 which extend along at least two opposite side walls 16 of the casing 14. A main latch 21, slidably received in the casing 14, is provided with machined shoulders 22 which engage the corresponding shoulders 20 of the striker plate when said main latch is in the normal or latched position shown in Fig. 2. Springs 23, of which there are preferably two diagonally disposed in the casing 14, rest with one end against the bottom wall 16a of said casing and are received in apertures 31 of the main latch 21, thus normally yieldingly urging the latter into latching position. Suitably mounted in, and extending from, said bottom wall 16a is a pin 24 which projects into a bore 25 of the main latch 21. The pin 24 and the hole 25 cooperate to guide the main latch 21 linearly to and from latching position. As best shown in Figs. 2 and 3, a considerable length of the wedging surface 21a of the main latch 21 projects beyond the face 21a of the main latch 21 when wedging surface 17a of the safety latch 17 when the former is in its latching position.

Associated with the safety latch 17 and the main latch 21 for cooperation therewith is the latch bolt 18 which is guided for longitudinal movement in any suitably constructed guide 26, mounted in a post 27 in the steel frame 28 of the automobile door 19. Inasmuch as the operation of the latch bolt 18 may be like that of any conventional latch bolt, the operating structure therefor is neither disclosed nor described herein, it being understood, however, that the relatively strong spring 35 normally urges said latch bolt into the latching position shown in Fig. 2 and that a door handle (not shown) is so drivingly connected with said latch bolt that manipulation of the former will withdraw the latter from its latching position so that the door 19 may be opened.

As best shown in Fig. 2, an end portion 30 of the door frame 28 is bent inwardly at an obtuse angle against the door post 27 so as to be in substantially uniform engagement with the wedging surface 17a of the safety latch 17 when the door is closed. Also, an end portion of the body frame 12 extends beyond the striker plate 10 and covers the latch bolt 18 when the door is closed.

On closing the door 19, the latch bolt 18 rides first over the wedging surface 17a of the safety latch 17 and is thereby wedged into a slightly retracted position until it clears said safety latch. On clearing the safety latch 17, the latch bolt 18 springs immediately into its normal or latching position, thereby depressing the main latch 21 while riding over the wedging surface 21a thereof. This is due to the fact that the combined force of the main latch springs 23 is made considerably less than the force of the latch bolt spring 35.

When the latch bolt 18 clears the main latch 21, i. e., when the door is completely closed, said main latch is released and forced by its springs 23 into the latching or interlocking position shown in Fig. 2. Substantial engagement between the safety latch 17 and the inwardly bent end portion 30 of the door frame 28 in conjunction with the interlocking engagement between the latch bolt 18 and the main latch 21 (Fig. 2) keeps the door 19 securely closed. Rubber pads (not shown) are preferably interposed in spaced intervals between the body post 11 and the inwardly bent end portion 30 of the door frame 28 to take up any play between the latter and the safety latch 17. The door 19 is opened by manipulating the non-disclosed door handle and thereby cause sufficient retraction of the latch bolt 18 from its latching position that the same clears the main latch 21.

It will be understood from the preceding description that the provision of the relatively weak main latch springs secures the important advantage that very little force need be exerted in order to close the door. Their provision made it possible that the latch bolt, on closing the door, does not have to yield appreciably against the tendency of the strong latch bolt spring to retain the latch bolt in latching position.

I claim:

1. As an article of manufacture, a striker plate comprising a casing open at one end having opposite flanges laterally projecting inwardly from said open end, one of said flanges terminating in a first plane retaining shoulder and extending laterally outwardly from said open end and having a wedging surface gradually ascending to the top of said shoulder, a main retainer slidable in the casing and having opposite stop shoulders and a portion projecting through the open end of said casing, said portion having a second plane retaining shoulder and a wedging surface gradually descending from the top of said second shoulder and extending to said first shoulder below the top thereof when said main retainer is in retaining position, and a spring between the bottom of the casing and said main retainer urging the latter into retaining position in which said stop shoulders engage said flanges.

2. The article of manufacture set forth in claim 1, further including a pilot pin projecting from the bottom of the casing and into a bore of the main retainer for guiding the latter.

3. A striker plate for door locks, comprising a mounting plate provided with a safety catch projecting to one side of said plate and a guide projecting to the other side of said plate, a main catch movable in said guide to and from a predetermined catching position, and a spring in said guide urging the main catch into catching position, said catches having catching shoulders so arranged that the shoulder of the main catch in catching position projects to said one side of the plate and beyond the shoulder of the safety catch and wedging surfaces ascending to their respective catching shoulders, and the wedging surface of the main catch in catching position ascending from adjacent the shoulder of the safety catch below the top thereof.

RICHARD E. JOYCE, Jr.